United States Patent Office 3,422,056
Patented Jan. 14, 1969

3,422,056
PROCESS OF PREPARING ISOTACTIC POLYPROPYLENE AND CARBON BLACK MIXTURES
Edwin B. Carton, Newtonville, Mass., assignor, by mesne assignments, to Polymer Dispersions, Inc., New York, N.Y., a corporation of Ohio
No Drawing. Filed July 14, 1965, Ser. No. 472,034
U.S. Cl. 260—41          11 Claims
Int. Cl. C08f 45/08; C08f 3/10

ABSTRACT OF THE DISCLOSURE

Novel isotactic polypropylene and carbon black mixtures and a process for their preparation comprising mixing sufficient carbon black and isotactic polypropylene at temperatures above about 550° F. sufficient to provide a masterbatch containing at least 20% carbon black and reducing the masterbatch at conventional temperatures to between about 0.1% and 35% carbon black by mixing therewith additional isotactic polypropylene.

---

The present invention relates generally to polypropylene compositions and more specifically to an improved process for dispersing carbon black in compositions comprising isotactic polypropylene.

The dispersion of carbon black into thermoplastic materials is a well-known and valuable art. Pigments, fillers, reinforcing agents and the like, such as carbon black, are often dispersed into thermoplastic materials in order to impart to the resulting compositions various desired qualities.

Generally speaking, dispersion of such solids is effected by (a) producing a superconcentrate or masterbatch dispersion of the solid in the thermoplastic material, and (b) letting down said superconcentrate to the desired solid content with further amounts of said thermoplastic material. A superconcentrate or masterbatch is for the purposes of the present invention a composition comprising a thermoplastic material having dispersed therein a relatively high proportion by weight of carbon black. Generally, said superconcentrate comprises above about 20% by weight of the total composition of a carbon black.

Dispersion of the solid, both in the production of the superconcentrate and in the final let-down step, is normally accomplished, by (a) heating the thermoplastic material to above the softening temperature thereof, and (b) mixing the solid into the resulting melt. The apparatus commonly used for such operations, such as hot roll mills and internal mixers such as typified by the well-known Banbury mixer are generally capable of effecting both heating of the material and mixing of the solid within a single zone. During the formation of the superconcentrate, the operational parameters of the mixing equipment are normally maintained so as to impart considerable shear work to the melt. Said parameters are generally readily controlled. For instance, in dispersion operations utilizing a two-roll mill, the shear work imparted to a melt can be increased by (a) decreasing the nip of the rolls, (b) increasing the speed of one roll relative to the speed of the other, (c) decreasing the temperature of the rolls, and the like.

Although dispersion methods employing substantial shear work are entirely suitable for the dispersion of particulate solids into many thermoplastic materials, it has been found that serious deleterious effects often arise when the thermoplastic material forming part of the superconcentrate comprises crystalline or "isotactic" polypropylene. Isotactic polypropylene often degrades during dispersion operations of the type mentioned above. Said degradation is generally readily noted as a diminution of clarity of the material and a darkening of the color thereof. Obviously, color changes of the superconcentrate upon degradation are often noticeable even after let-down of the superconcentrate to the desired concentration, although such changes cannot normally be observed when carbon black is present. Further, said degradation of isotactic polypropylene during dispersion operations in forming the superconcentrate can result in nonuniformity of dispersion and can have harmful effects on the physical properties of the ultimate composition. In accordance with the present invention however, these problems have largely been eliminated.

Accordingly, it is a principal object of the present invention to provide an improved process for dispersing carbon black into isotactic polypropylene.

It is another object of the present invention to provide an improved process for producing unusually uniform dispersions comprising isotactic polypropylene and carbon black.

It is still another object of the present invention to provide a process for the dispersion of carbon black into isotactic polypropylene in which degradation of the polypropylene is vastly reduced.

Other objects and advantages of the present invention, will in part be obvious and will in part appear hereinafter.

In accordance with the present invention it has been discovered that unusually uniform dispersions of carbon black in isotactic polypropylene without the normally attendant problem of substantial degradation of the polypropylene during dispersion operations can be achieved when (1) a superconcentrate is produced by (a) heating isotactic polypropylene to unusually high temperatures and (b) mixing thereinto above about 20% by weight of the total composition of carbon black, and (2) letting down the resulting superconcentrate to the desired solids content with further amounts of isotactic polypropylene under ordinary dispersion conditions.

The term "isotactic" refers to a high degree of order of substituent branching on the polypropylene molecule chain. Alternatively, when said branching is substantially completely random the polypropylene is said to be "atactic." A simple test has been developed by which the relative tacticity of a particular polypropylene can be determined. Said test depends upon the solubility of a polypropylene sample in boiling n-heptane, the more isotactic the polypropylene, the less the solubility thereof. For the purposes of the present invention any polypropylene which is more than about 75% by weight insoluble in boiling n-heptane is considered to be isotactic.

The superconcentrate, as has been mentioned before, contains above about 20% by weight of the total composition of carbon black. The upper limits of solid content can vary depending to a large extent upon the particle size of the carbon black incorporated. For instance, for superconcentrates comprising a thermal type carbon black as much as about 80% carbon black or even higher loadings can be achieved, although it is normally desirable that the superconcentrate contain no more than about 65% by weight of the total composition of carbon black.

It should be noted that the superconcentrate can be produced on dispersion equipment well-known to the art. However, the present invention contemplates the use of melt temperatures exceeding by far those normally encountered in the art. Principally, it is necessary that the isotactic polypropylene forming part of the superconcentrate be heated to above about 550° F. and preferably to between about 575° F. and about 625° F. concomitant with the mixing of the carbon black thereinto. Isotactic polypropylene heated to the above-mentioned temperatures is of relatively low viscosity and degradation thereof during dispersion operations is surprisingly and substantially lower than is encountered in prior art dispersion processes (i.e. normally at temperatures between about 350° F. and about 400° F.). Thus, for a given nip dimension and roll speed during two roll mill dispersion operations, the shear work imparted to the high temperature isotactic polypropylene melts of the present invention is generally much less than that imparted to lower temperature melts of prior art dispersion processes. This "low shear" effect is easily ascertained by measuring the torque of the rolls during dispersion operations which measurement is well known in the art as being directly indicative of the shear work being accomplished. Thus, under operating conditions of low shear, the torque of the rolls will be proportionately less than when a high degree of shear is being produced.

The carbon black employed in the practice of this invention should be substantially insoluble in isotactic polypropylene, that is, said carbon black should remain in the polypropylene as a discrete solid material. The average particle diameter of the carbon black can range from about 5 to about 50 millimicrons. Preferred, however, are carbon blacks having an average particle diameter of between about 10 and about 30 millimicrons. Specific examples of suitable carbon blacks are the furnace, channel and thermal carbon blacks. Especially preferred are the channel carbon blacks.

The superconcentrate as mentioned hereinbefore is "let-down" or diluted with additional isotactic polypropylene to the desired ultimate concentration of carbon black. Generally, the superconcentrates of the present invention are reduced to between about 0.1% to about 35% by weight of the total composition of carbon black and usually to between about 0.5 to about 15%. Said superconcentrates are generally reduced with additional polypropylene at standard dispersion temperatures and shear conditions to achieve unusually uniform dispersion of the carbon black in the final composition.

A better understanding of the invention can be obtained from the following examples which, however, should be construed as being illustrative in nature and as not limiting the scope of this invention.

EXAMPLE 1

Into a 1200 gram capacity Banbury type mixer is charged 500 grams of "M-53," an isotactic polypropylene produced by Avi Sun Corp. and having a melt index of about 2.9, and 500 grams of a channel type carbon black having an average particle diameter of about 16 millimicrons. The mixer is then operated at 116 r.p.m. at a ram pressure of about 24 p.s.i.g. During the first 3 minutes at the above-mentioned conditions the temperature of the polypropylene increases to about 375° F. which temperature is thereafter maintained by flowing cooling water through the mixer. Fluxing of the polypropylene occurs and the mixing is allowed to continue for an additional 9 minutes. The resulting superconcentrate is then dumped from the mixer and cooled. Fifty grams of this superconcentrate is then charged into the Banbury mixer with an additional 950 grams of said polypropylene. The aforementioned mixing cycle is repeated and the temperature of the polypropylene melt is maintained at about 375° F. The final composition comprising about 2½% by weight carbon black is then dumped and cooled.

The quality of the dispersion of the carbon black in the resulting product was determined in the following manner: After cooling, the polypropylene composition is cut into small chips which are placed on a microscope slide heated to 400° F. A second slide is pressed on top of the sample to form a film having a thickness of about 5 mils. The slides are removed from the hot plate, cooled and observed microscopically at about 100× magnification. A series of 10 standard slide specimens having serially descending degrees of uniformity of dispersion of carbon black in polyethylene are utilized as comparison standards for the test compositions undergoing examination. Slide number one has the most uniform dispersion of carbon black and slide number 10 represents the least uniform dispersion. Slides Nos. 1–5 are generally considered to be of commercially acceptable dispersion quality. The test composition prepared in Example 1 is compared with the standard slides and the dispersion is found to be similar to standard slide number 9.

EXAMPLE 2

This example is a duplicate of Example 1 with the exception that during production of the superconcentrate the temperature of the polypropylene melt was increased by steam, heating the mixing apparatus to about 510° F. Subsequently, 50 grams of the superconcentrate was let-down at a melt temperature of about 375° F. as in Example 1 with an additional 950 grams of polypropylene. The resulting composition was evaluated in the manner described in Example 1 and was found to be similar to standard slide No. 7 which indicates that the carbon black was slightly more uniformly dispersed in the polypropylene than was the case in Example 1.

EXAMPLE 3

This example is a duplicate of Example 1 with the exception that the temperature of the polypropylene melt was increased by means of steam to about 600° F. during the production of the superconcentrate. Subsequently, the superconcentrate was let down to 2½% by weight carbon black in the same manner as in Examples 1 and 2. The resulting composition was evaluated in the manner described in Example 1 and was found to be similar to standard slide 3. The melt index of the composition was determined to be 3.5.

EXAMPLE 4

1000 grams of M-53 polypropylene was charged into the Banbury and the temperature of the melt was increased to 600° F. as in Example 3. After dumping and cooling the melt index of said polypropylene was determined to be about 50. Subsequently, 50 grams of this polypropylene was let-down with an additional 950 grams of polypropylene in the manner described in the previous examples. The melt index of the resulting composition was determined to be about 10.0 which indicates that polypropylene in the absence of carbon black will degrade under conditions of high temperature and low shear.

We are presently unable to explain precisely why there is such a marked improvement in the quality of the dispersion of particulate solids in isotactic polypropylene when a superconcentrate comprising isotactic polypropylene and a carbon black is prepared at unusually high melt temperatures, and the resulting superconcentrate is then let-down in a standard let-down step. It is believed, although there is no intent to be bound by this explanation, that dispersion of high concentrations of carbon black in isotactic polypropylene at the hereinbefore mentioned elevated melt temperatures generally results in an unusually low viscosity system. Said unusually low viscosity is, in turn, less sensitive to degradation by shear forces and a greater uniformity of energy input into the mix generally results. Consequently relatively high concentrations of carbon black can be incorporated into isotactic polypropylene at the high temperatures contemplated by the present invention without substantial degradation to the polypropylene. Therefore, it is also believed that when carbon black is incorporated into isotactic polypropylene at high temperatures, the carbon black further enhances the stabilization of the polypropylene. Additionally, it is thought that isotactic polypropylene melts which have not undergone substantial degradation provide improved wetting of the carbon black and less agglomerate formation during dispersion and thereby result in superior dispersions.

Obviously, many possible modifications in the above examples and description can be made without departing from the scope and spirit thereof of the present invention.

For instance, the compositions prepared in accordance with the present invention can comprise other substances in addition to the carbon black and polypropylene such as antioxidants, plasticizers, fillers and the like. Specifically antioxidants can be added to the carbon black and polypropylene compositions. Moreover, it is preferred that the antioxidant be added to the superconcentrate before the temperature is allowed to increase to 600° F. because, in addition to the carbon black, antioxidants are also beneficial in stabilizing the polypropylene from degradation.

Also, as mentioned hereinbefore, carbon black other than channel type carbon black can be utilized in the present invention provided, of course, that the particle size limitations set forth hereinbefore are maintained.

Furthermore, although not described in the examples illustrated above, the superconcentrate can be "let-down" in more than one step. As is well known in dispersion art, a plurality of "let-down' steps is often desirable. For instance, in the examples illustrated above, the superconcentrate can be let-down with additional isotactic polypropylene to produce a concentration of 25 parts of isotactic polypropylene to one part carbon black, followed by an additional let-down with isotactic polypropylene to produce a final concentration of 50 parts of isotactic polypropylene to 1.25 part of carbon black.

Having described the invention what is claimed is:

1. A novel process for producing superior masterbatches comprising isotactic polypropylene and carbon black which comprises: heating isotactic polypropylene to a temperature above about 550° F. but below the decomposition temperature of the isotactic polypropylene while mixing thereinto sufficient carbon black to provide a masterbatch comprising at least about 20 weight percent carbon black, said carbon black having an average particle diameter in the range of from about 5 to about 50 millimicrons.

2. The process of claim 1 wherein said isotactic polypropylene is heated to between about 575° F. and about 600° F.

3. The process of claim 1 wherein said carbon black has an average particle diameter of between about 10 and about 30 millimicrons.

4. The process of claim 3 wherein said carbon black is channel black.

5. The process of claim 1 wherein said masterbatch produced comprises between about 30 weight percent and about 65 weight percent carbon black.

6. A process for producing improved dispersions comprising isotactic polypropylene and carbon black which comprises (1) heating isotactic polypropylene to a temperature above about 550° F. but below the decomposition temperature of the isotactic propylene while mixing thereinto sufficient carbon black to provide a composition comprising at least about 20 weight percent carbon black, said carbon black having an average particle diameter in the range of from about 5 to 50 millimicrons, and (2) reducing said composition at conventional temperatures by mixing therein sufficient isotactic polypropylene to provide a dispersion comprising between about 0.1 weight percent and about 35 weight percent carbon black.

7. The process of claim 6 wherein said composition comprises between about 30 weight percent and about 65 weight percent carbon black.

8. The process of claim 6 wherein the isotactic polypropylene of step (1) is heated to between about 575° F. and about 625° F.

9. The process of claim 6 wherein said carbon black is channel black.

10. The process of claim 6 wherein the carbon black concentration of said composition is reduced to between about 0.5 weight percent and about 15 weight percent.

11. The process of claim 6 wherein said reduction is accomplished stepwise.

References Cited

UNITED STATES PATENTS

| | | | |
|---|---|---|---|
| 2,881,156 | 4/1959 | Pilar et al. | 260—41 |
| 3,135,379 | 6/1964 | Naudain | 260—41 |

FOREIGN PATENTS

| | | |
|---|---|---|
| 869,391 | 5/1961 | Great Britain. |

ALLAN LIEBERMAN, *Primary Examiner.*